G. M. MICHAELIS.
AUTOMATIC SELF STRIKING AND LANDING REEL FOR COMMERCIAL FISHING.
APPLICATION FILED OCT. 9, 1919.
1,360,429.
Patented Nov. 30, 1920.
2 SHEETS—SHEET 1.
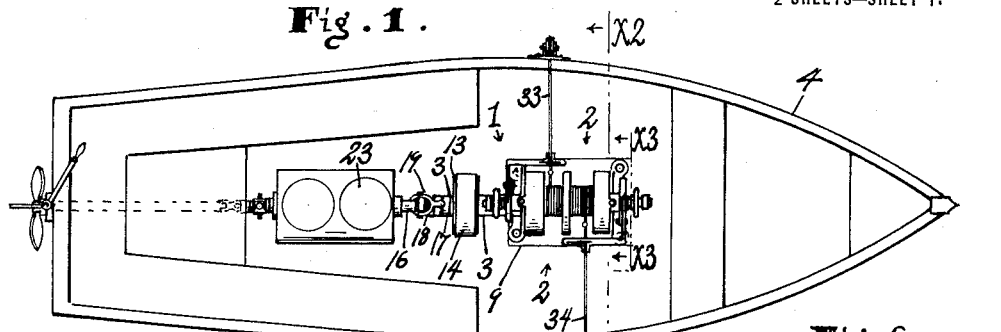
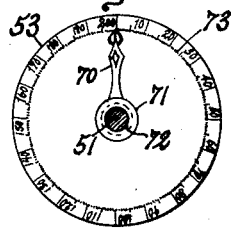
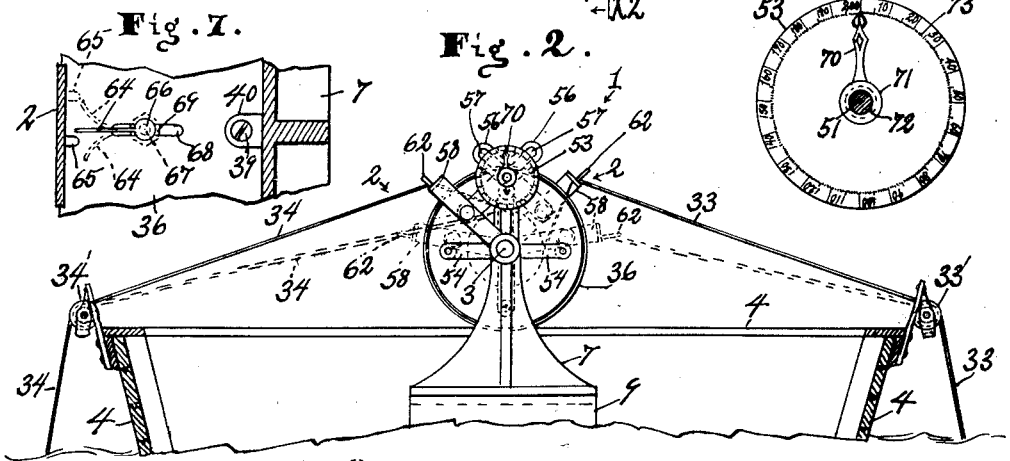
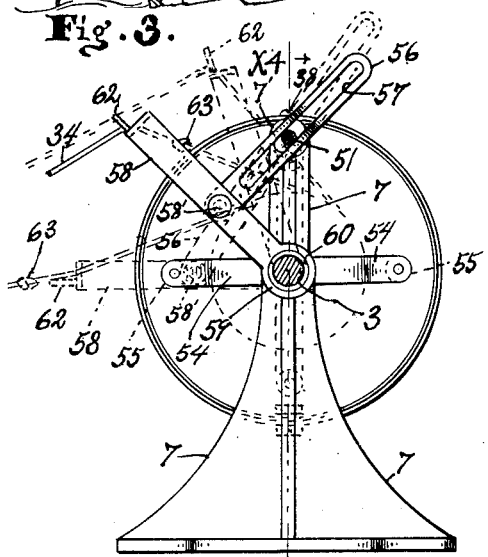
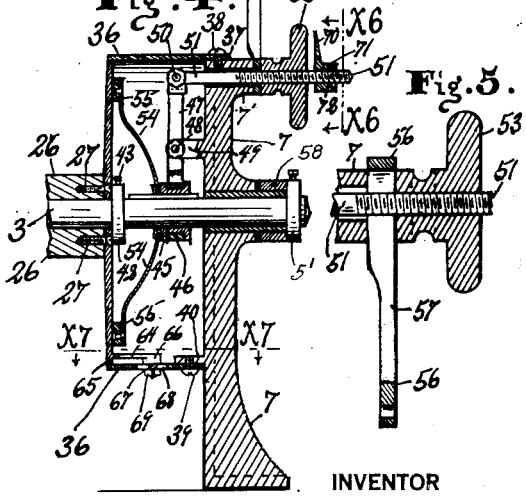
Witness:
W. M. Gautte
INVENTOR
George M. Michaelis.
BY
ATTORNEY G. M. MICHAELIS.
AUTOMATIC SELF STRIKING AND LANDING REEL FOR COMMERCIAL FISHING.
APPLICATION FILED OCT. 9, 1919.
1,360,429.
Patented Nov. 30, 1920.
2 SHEETS—SHEET 2.
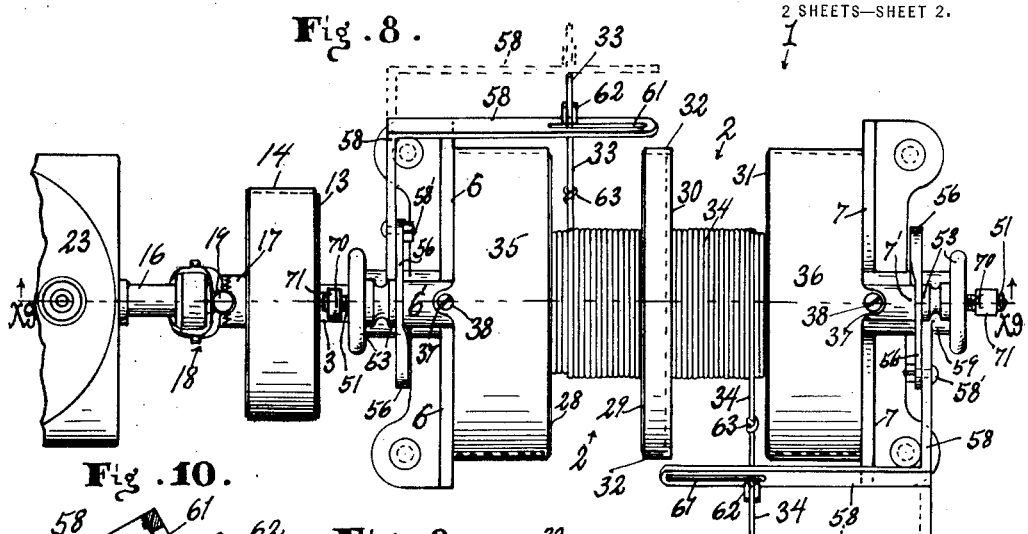
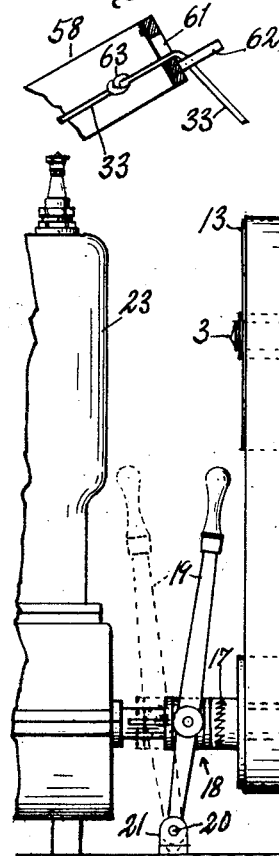
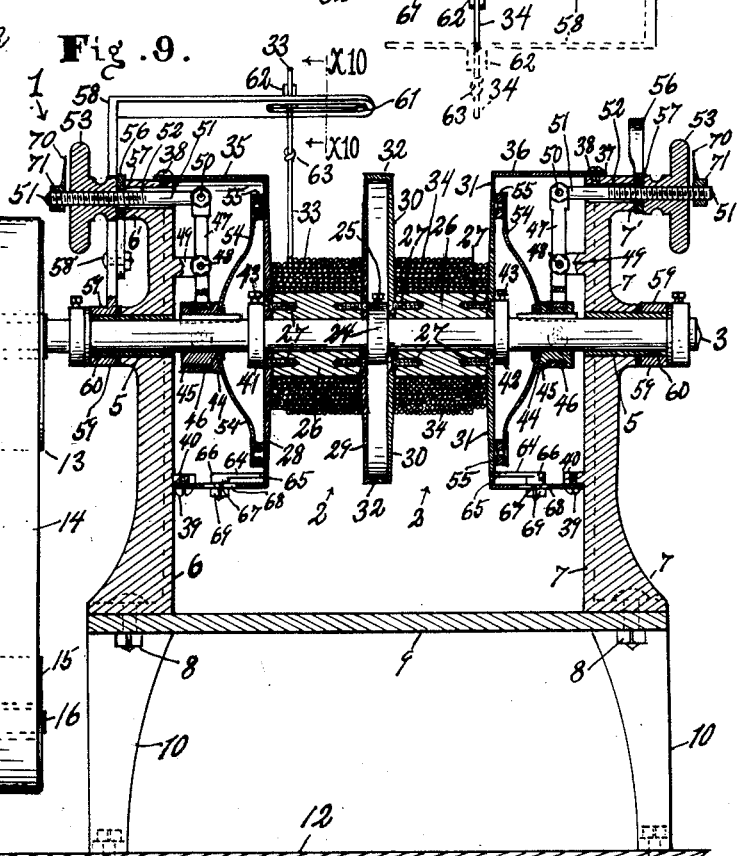
INVENTOR
George M. Michaelis.
BY James R. Townsend
ATTORNEY

UNITED STATES PATENT OFFICE.

GEORGE M. MICHAELIS, OF WILMINGTON, CALIFORNIA.

AUTOMATIC SELF STRIKING AND LANDING REEL FOR COMMERCIAL FISHING.

1,360,429.　　　　　Specification of Letters Patent.　　Patented Nov. 30, 1920.

Application filed October 9, 1919. Serial No. 329,563.

*To all whom it may concern:*

Be it known that I, GEORGE M. MICHAELIS, a citizen of the United States, residing at Wilmington, in the county of Los Angeles and State of California, have invented a new and useful Automatic Self Striking and Landing Reel for Commercial Fishing, of which the following is a specification.

This invention relates to appliances for commercial fishing; and it is an improvement of a reel for which United States Letters Patent were issued to me the 6th day of June, 1905, No. 791,805; also in addition to improvements of the reel there are incorporated other important and indispensable features that automatically co-act with the reel, and the invention may be said to consist in the provision of the novel features, the improved construction, combination and arrangement of parts as will appear hereinafter.

An object of the invention is to provide means for automatically controlling a plurality of fishing lines that are disposed at opposite sides of a fishing craft.

Another object is to provide a manual and automatic means for increasing the tension of the spring clutches to tire and retard the fish as they struggle to escape and thereby unwind the fishing lines from the spools.

Another object of the invention is to provide an automatic striker for snagging or hooking the fish.

Another object of the invention is to provide an appliance for indicating the pounds pull on the lines as they are unwound from the spools, thereby enabling the fisherman to increase or decrease the amount of pull necessary to retard the movement of the fish away from the reel; and to do so without danger of losing the fish or breaking the line.

Another object of the invention is to provide adjustable automatic clickers that will indicate when fish are hooked and running with the lines.

Other objects and features of invention may appear from the accompanying drawings, the subjoined detailed description and the appended claims.

The drawings illustrate the invention.

Figure 1 is a plan view of the appliance installed on a small fishing boat.

Fig. 2 is an enlarged section on line $x^2$ of Fig. 1, parts broken away and parts omitted, showing the appliance in end elevation with the striking arm set in position to strike.

Fig. 3 is an enlarged section on line $x^3$ of Fig. 1, many parts omitted for the sake of clearness, showing one reel in end elevation; also showing the striking arm in position to strike; and showing by dotted lines its position before and after it has been actuated.

Fig. 4 is a section on the line $x^4$ of Fig. 3.

Fig. 5 is an enlarged detail of what is shown in the upper right hand corner of Fig. 4, the tension wedge being shown in full section and also moved down to position for retarding the reels or breaking them from free rotation.

Fig. 6 is an enlarged section on line $x^6$ of Fig. 4, showing the pound-pull indicator.

Fig. 7 is a section on line $x^7$ of Fig. 4 showing a detail of one adjustable automatic clicker.

Fig. 8 is an enlarged plan of appliance as shown in Fig. 1, the boat and supporting stand omitted and part of the engine broken away.

Fig. 9 is a section on line $x^9$ of Fig. 8.

Fig. 10 is an enlarged section on line $x^{10}$ of Fig. 9.

The reel 1 consists of the spools 2 and associated parts that are operatively connected to a shaft 3. Any number of spools can be employed, but for convenience only two are shown and described; and as seen in the drawings the appliance is positioned centrally and toward the forward part of the small fishing boat 4.

The shaft 3 is mounted in the bushings 5 that are secured in the oppositely disposed bearing stands 6, 7, that are secured by the bolts 8 to the top of the table 9 and shaft 3 is held from endwise movement in these stands by collars 5'. The table 9 is supported by the legs 10 which have their feet secured by the bolts 11 to the tread board 12 in the bottom of the boat 4.

On end of the shaft 3 there is secured a large pulley 13 and another pulley 15 is loosely mounted on one end of the engine shaft 16. The pulley 15 has the hub extension 17 that is toothed to form one member of the clutch; which clutch is of common construction and keyed to the shaft 16 in the usual way. The clutch member 18 is moved into or out of engagement with the member 17 by the hand lever 19; which lever has its lower end fulcrumed on the pin 20 in the standard 21 that is secured by the bolt 22 to the tread board 12.

When the engine 23 is in operation and the lever 19 is actuated to engage the clutch member 18 with the member 17 the shaft 3 will be rotated in a direction that will wind the fishing lines on to the spools 2 when rotary clutch members, that will be hereinafter explained, are moved into engagement with the spools.

About midway of the shaft 3 is the collar 24 that is secured to the shaft by the set screw 25; and on opposite sides of this collar and loosely mounted on the shaft 3 are the spools 2. These spools are each formed of the hubs 26 to which are secured by the screws 27 the circular disks or end plates 28, 29, 30, 31. The end plate 30 is slightly larger than the plate 29 and it has the outwardly and transversely extending flanged rim 32 that overlies the periphery of the disk 29, the purpose of which is to prevent either of the fishing lines 33 or 34 from jumping over the disks 29 or 30 and entangling with the revolving shaft 3. There is a slight clearance between the periphery of the disks 28, 31 and the inner wall of the drums 35, 36 so that the spools are free to run without frictional contact with these fishing line guards.

The drums 35, 36 have top flange extensions 37 that are secured by the screws 38 to the upper ends of the bearing stands 6, 7; and the lower part of the drums are secured by screws 39 to the flanges 40 on the bearing stands 6, 7.

Abutting the exterior sides of the disks 28, 31 are the collars 41, 42 that are secured by the set screws 43 to the shaft 3 by which means the spools 2 are loosely disposed on the shaft and positioned between the collars so that they are free to rotate, but are prevented from excessive endwise movement.

Within the drums 35, 36 and mounted on the shaft 3 are the hubs 44 having circumferential grooves 45 in which the split rings 46 are mounted, which rings are secured in the bifurcated ends of the levers 47. The levers 47 are fulcrumed on the pins 48 that are mounted in the extensions 49 that are integral with the bearing stands 6, 7.

The other ends of the levers 47 are connected by the pins 50 to one end of the rods 51 which rods pass loosely through an opening 52 in the extensions 6', 7' on the upper ends of the bearing stands 6, 7; and the other ends of the rods 51 are threaded to fit the threaded sockets of the hand wheels 53.

The hubs 44 are keyed to the shaft 3, the key way in the hubs being enlarged so that the hubs can slide freely along the shaft when they are actuated by movement of the levers 47.

Fastened to the hubs 44 are a plurality of radially extending spring arms 54 that are curved toward the spools 2 and the tips of these spring arms are provided with frictional contact blocks 55 that are adapted to be moved either into or out of engagement with the spools 2 when the levers 47 are actuated.

Wedges 56 having slots 57 therein are interposed between the hand wheels 53 and the extensions 6', 7' on the upper ends of the bearing stands 6, 7, the wedges being positioned so that the rods 51 pass through the slots 57. The wedges 56 are actuated by means of the bent levers 58 which levers have the ends 59 pivotally mounted on the extending bushings 60 that are secured in the stands 6, 7; and one end of the wedges 56 are pivotally connected to the levers 58 by the bolts 58'. The other ends of the levers 58 are bent over so that a portion thereof extends longitudinally with the spools and the free ends of these levers have the slots 61 that are in length substantially the distance across the face of the spools, through which slot the fishing lines extend and through which they play when in action. Also the fishing lines are preferably mounted on the sheave pulleys 33', 34' which pulleys are secured by any well known means to the sides of the boat as shown in the drawings.

Near to one end of the slots 61 there are secured to the levers 58 pairs of trip pins 62 which pins are spaced apart the width or thickness of the fishing lines; and the purpose of these pins is to catch a knot or button 63 on the fishing line and throw the levers 58 downward when the lines are drawn out by fish.

The downward movement of the levers 58 also moves the enlarged portion of the wedges 56 to a position between the hand wheels 53 and the extensions 6', 7' on the upper ends of the bearing stands 6, 7 and thereby shifts the wheels 53 outwardly and moves the rods 51 that operate the levers 47 to move the clutch members 55 into engagement with the spools 2 and retard them. This retarding or braking of the reels is for the purpose of preventing the fish from running out too far with the lines and stripping them from the spools.

Also this retarding pull to the lines is for the purpose of snagging the fish and controlling them after they are hooked, which will later be more fully explained.

The foregoing movement of parts is accomplished by turning the levers 58 upward until they move the wedges 56 to a position where their narrowest parts are between the hand wheels 53 and extensions 6′, 7′ in which position the spring arms 54 are holding the contacts 55 in light contact with the spools so that the latter are free to move when fish first take the bait. After the fish have taken the bait and begun moving the lines, the spools move freely until the knots or buttons 63 are moved from the spools and engage the trip pins 62 which engagement of parts will move the arms 58 from dotted to dotted position shown in Fig. 3.

When the arms 58 reach the lower dotted or striking position shown in Figs. 2 and 3 the knots 63 escape from the trip pins 62. As seen in Fig. 10 the slots 61 in the arms 58 are large enough for the free passage of the knots 63; and as also seen in the other drawings the lines readily escape from between the pins 62 when the arms 58 are moved downward.

As previously stated the downward movement of the arms 58 moves the thickened portion of the wedges 56 between the hand wheels 53 and extensions 6′, 7′ which movement of parts actuates the contacts 55 to retard the spools; and this retarding of the reels causes the strike that snags or hooks the fish.

When the fish take the bait and start with the line the fisherman is warned of an impending strike by means of spring tongues 64 that are actuated by fingers 65 integrally connected to the spools. In other words each revolution of the spools causes the fingers 65 to contact with the free ends of the tongues 64 and set them into audible vibration.

The tongues 64 have one end integrally connected with the heads 66 of the bolts 67 which bolts extend downward through the slots 68 in the bottom of drums 35, 36 and are secured in place by the nuts 69; and by means of the slots 68 the tongues are adjusted toward or away from the fingers 65.

After the fish have been snagged by the tension automatically applied to the line as hereinbefore described additional tension can be applied to the lines or the tension released by the manual operation of the hand wheels 53; that is by rotating these wheels so as to draw the rods 51 outward the levers 47 will be actuated to apply additional pressure to the spring arms 54 and thereby apply a heavier contact of the blocks 55 to the spools and vice versa. By the foregoing means the fisherman applies pressures to the blocks 55 until the resistance of the fish is overcome; after which the clutches are additionally actuated to cause the reels to rotate in unison with the rotating clutches and thereby retrieve the lines or rewind them on the spools by the engine.

Indicating fingers 70 have the hub portions 71 that are provided with screw sockets 72 that are screwed on the outer ends of the rods 51 so that the pointers of the fingers 70 are at o on the indicator scale 73 when the hubs of the wheels 53 abut or contact with the reduced portion of the wedges 56. Before the indicator fingers are set the wheels 53 are adjusted to apply a desired pull or tension on the fishing lines when the striking arms are actuated; then with the fingers set as hereinbefore described the wheels can be turned relative to these indicating fingers to release or apply pressure to the spools which change of pressure will decrease or increase the pounds-pull on the lines proportionally to the scale on the hand wheels, by which means the fisherman knows exactly how much resistance he is applying to his outgoing lines; and also how much resistance he can apply without danger of losing the fish or breaking the lines; that is, a partial turn to one complete turn of the hand wheels, after they have been properly adjusted, applies an additional pull to the lines of from one pound to two hundred pounds, or sufficient to check the run of any ordinary commercial sea fish.

In operation the appliance is positioned in a fishing boat as hereinbefore described and the spools provided with lines for deep sea fishing. Assuming that the lines are properly provided with hooks, bait and weights the spools are permitted to run loosely on the shaft 3 until the weights reach the fishing beds which are usually about six hundred feet in depth, leaving on the spools considerable line for the play of the fish. When the fishing depth is determined, knots or trip buttons are fixed to the lines so that additional unreeling of the lines will bring these buttons into contact with the trip pins on the striking arms 58, and the arms elevated to the desired position. Then the proper adjustments of the hand wheels and indicators are made. In the meantime the clutch lever 19 is actuated so that the engine is driving the shaft 3 on which the spools 2 are mounted. When fish attack the bait they run with the lines which moves the buttons into contact with the pins on the trip arms by which the latter are moved to set the clutches on the spools and retard them by which means the free outward run of the lines is suddenly stopped, thereby snagging or hooking the fish; after which the fisherman normally tightens the clutches to the spools by the hand wheels 53 so as to retrieve the lines by engine power.

In trolling the lines are paid out a desired distance and when a strike is made the appliance is operated for retarding, controlling and retrieving the fish as hereinbefore described.

I claim.

1. In a reel adapted for fishing, a shaft;

a spool revolubly mounted on said shaft; a clutch movably mounted on said shaft; and automatic means for moving said clutch to engage said spool.

2. In a reel adapted for fishing, a shaft; spools revolubly mounted on the shaft; a clutch for each spool, said clutches movably mounted on the shaft; and automatic means for moving said clutches so as to engage said spools.

3. In a reel adapted for fishing, a shaft; spools on said shaft adapted for taking up lines; clutches for engaging said spools, said clutches being movably mounted on said shaft; and striking arms adapted to be operated for actuating said clutches.

4. In a reel adapted for fishing, a shaft; spools revolubly mounted on said shaft; rotary clutches carried by the shaft for frictionally engaging said spools; striking arms; and means whereby said striking arms will move said rotary clutches so as to engage and rotate said spools.

5. In a reel adapted for fishing, a shaft; spools revolubly mounted on said shaft; rotary clutches carried by the shaft for frictionally engaging said spools; striking arms; wedges pivotally connected with said striking arms; connections between said wedges and said rotary clutches; lines on said spools for moving said striking arms so that they actuate said wedges; and means for driving said shaft in a direction adapted to wind said lines on said spools.

6. In a reel adapted for fishing, a shaft; spools revolubly mounted on said shaft; rotary clutches attached to said shaft; striking arms; wedges pivotally connected with said striking arms, said wedges adapted for actuating said clutches; lines on said spools for actuating said striking arms so that said wedges are moved and thereby actuate said rotary clutches; and means for constantly driving said shaft in a direction adapted to wind said lines on said spools.

7. In a reel adapted for fishing, spools; clutches adjacent to said spools; striking arms pivotally connected with wedges that are adapted to move said clutches into engagement with said spools; and lines on said spools, said lines being adapted to move said striking arms for actuating said wedges.

8. In a reel adapted for fishing, spools rotatably mounted on a shaft; striking arms; lines on said spools, said lines being adapted to actuate said striking arms; rotary clutches adjacent to said reels; and means whereby said clutches are moved into engagement with said spools when said striking arms are actuated by said lines.

9. In a reel adapted for fishing, a shaft; spools mounted on said shaft; striking arms pivotally mounted on said shaft; trip pins attached to said striking arms; lines on said spools, said lines being adapted to move between said trip pins; knots or buttons on said lines for engaging said trip pins; clutches adjacent to said spools; and means whereby said clutches are moved into engagement with said spools when knots or buttons on said lines engage trip pins and actuate said striking arms.

10. In a reel adapted for fishing, a shaft; spools mounted on said shaft; striking arms pivotally mounted on said shaft; trip pins attached to said striking arms; lines on said spools, said lines passing through slots in the free ends of said striking arms; trip pins attached to said striking arms; means connected with said lines for engaging the trip pins so as to actuate the striking arms; and clutches adjacent to said spools, said clutches being moved into engagement with said spools when said striking arms are actuated.

11. In a reel adapted for fishing, the combination with a spool revolubly mounted in the reel, of a revoluble clutch adjacent to said spool; means for moving said clutch so as to retard the movement of the spool in one direction; and means whereby said revoluble clutch rotates said spool in the other direction.

12. In a reel adapted for fishing, the combination with a spool revolubly mounted in the reel, of a revoluble clutch adjacent to said spool; a striking arm connected with said spool; means for moving the revoluble clutch into engagement with said spool so as to retard the movement of the spool in one direction when the striking arm is actuated; and means for additionally contacting said revoluble clutch with said spool in order to rotate the spool in the other direction.

13. In a reel adapted for fishing, a spool; a revoluble clutch adjacent to said spool; a striking arm connected with said spool; automatic means for moving said revoluble clutch into engagement with said spool so as to retard the movement of the spool in one direction when said striking arm is actuated; and manual means for additionally contacting said revoluble clutch with said spool in order to rotate the spool in the other direction.

14. In a reel adapted for fishing, a spool; a revoluble clutch adjacent to said spool; a striking arm connected with said spool; automatic means for moving said revoluble clutch into engagement with said spool so as to retard or stop the movement of the spool in one direction; a hand wheel for additionally contacting said clutch with said spool in order to rotate the spool in the other direction; and an indicator in connection with said hand wheel.

15. In a reel adapted for fishing, a spool;

a tongue adjustably mounted adjacent to said spool; and a finger on said spool for engaging said tongue.

16. In a reel adapted for fishing, a countershaft operatively connected with, and driven by, an engine shaft; a plurality of spools loosely mounted on said countershaft; revoluble clutches on said countershaft, said clutches being adapted for manual or automatic movement into or out of clutching engagement with said spools; and auditory annunciators for indicating the rotation of said spools.

In testimony whereof, I have hereunto set my hand at Los Angeles, California, this 19th day of September, 1919.

GEORGE M. MICHAELIS.

Witness:
JAMES R. TOWNSEND.